US010598849B2

(12) United States Patent
Takano et al.

(10) Patent No.: US 10,598,849 B2
(45) Date of Patent: Mar. 24, 2020

(54) OPTICAL DEVICE HAVING EO POLYMER CORE AND SPECIALLY-POLYMERIZED CLAD

(71) Applicant: Sumitomo Osaka Cement Co., Ltd., Tokyo (JP)

(72) Inventors: Shingo Takano, Tokyo (JP); Yuki Kugimoto, Tokyo (JP); Yoshizumi Ishikawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/367,726

(22) Filed: Mar. 28, 2019

(65) Prior Publication Data
US 2019/0302355 A1 Oct. 3, 2019

(30) Foreign Application Priority Data

Mar. 29, 2018 (JP) .................. 2018-065354

(51) Int. Cl.
G02B 6/02 (2006.01)
G02B 6/122 (2006.01)
G02F 1/00 (2006.01)
G02F 1/065 (2006.01)
G02B 6/12 (2006.01)

(52) U.S. Cl.
CPC ....... *G02B 6/02033* (2013.01); *G02B 6/1221* (2013.01); *G02F 1/0018* (2013.01); *G02F 1/065* (2013.01); *G02B 2006/12035* (2013.01); *G02F 2202/022* (2013.01)

(58) Field of Classification Search
CPC ............. G02B 6/02033; G02B 6/1221; G02B 2006/12035; G02F 1/065; G02F 1/0018; G02F 2202/022
See application file for complete search history.

(56) References Cited

U.S. PATENT DOCUMENTS

2013/0121631 A1   5/2013  Yu et al.
2019/0302355 A1*  10/2019 Takano

FOREIGN PATENT DOCUMENTS

CN    110320597 A  * 10/2019
JP    2007-025370 A   2/2007

* cited by examiner

*Primary Examiner* — Andrew Jordan
(74) *Attorney, Agent, or Firm* — IpHorgan Ltd.

(57) ABSTRACT

An optical device including a core layer that includes an EO polymer, and clad layers that are disposed on and beneath the core layer, in which a polymer polymerized in a composition containing a reactive ionic liquid is used in the clad layers.

5 Claims, 1 Drawing Sheet

OPTICAL DEVICE HAVING EO POLYMER CORE AND SPECIALLY-POLYMERIZED CLAD

CROSS-REFERENCE TO RELATED APPLICATIONS

This application claims the benefit of Japanese Patent Application No. 2018-065354 filed Mar. 29, 2018, the disclosure of which is herein incorporated by reference in its entirety.

BACKGROUND OF THE INVENTION

Field of the Invention

The present invention relates to an optical device and particularly to an optical device in which clad layers are disposed on and beneath a core layer and the core layer includes an organic electrooptic polymer (hereinafter, referred to as "EO polymer").

Description of Related Art

In recent years, optical devices in which the EO polymer is used have been expected as an element that is responsible for next-generation optical communication (refer to Patent Document 1 or 2).

Examples of polymeric materials that are used in the EO polymer include acrylic resins such as polymethyl methacrylate and the like, polycarbonate-based resins, epoxy-based resins, polyimide-based resins, silicone-based resins, polystyrene-based resins, polyamide-based resins, polyester-based resins, phenolic resins, polyquinoline-based resins, polyquinoxaline-based resins, polybenzoxazole-based resins, polybenzothiazole-based resins, polybenzoimidazole-based resins, and the like. (hereinafter, referred to as "basic skeleton resins").

Nonlinear optical organic compounds (hereinafter, "EO pigments") are not particularly limited as long as the nonlinear optical organic compounds are well-known compounds, but molecules having a structure in which both an electron-donating atomic group (hereinafter, referred to as "donor") and an electron-accepting atomic group (hereinafter, referred to as "acceptor") are present in one molecule and a π-conjugated system atomic group is disposed between the donor and the acceptor are desirable. Specific examples of such molecules include Disperse Red dyes, Disperse Orange dyes, stilbene compounds, and the like.

The EO polymer refers to a substance obtained by adding the EO pigment to a polymeric material or introducing the EO pigment to a polymeric material by a chemical bond to a side chain or a main chain of the polymeric material. When subjected to a polling treatment that orients the donor and the acceptor, the EO polymer exhibits a stronger secondary nonlinear optical effect than inorganic materials. In addition, electrons migrating in the highly conductive π-conjugated system in the EO pigment change the optical characteristics of the EO polymer, which enables high-frequency operation.

Optical waveguides in optical devices are generally formed in a structure in which a core layer having a high refractive index is surrounded by clad layers having a low refractive index. Optical devices in which the EO polymeric material is used have a well-known structure in which a core layer has a rib-type structure and is provided with clad layers on and beneath the core layer. FIG. 1 is a cross-sectional view showing an example of an optical waveguide structure in which the EO polymer of the related art is disposed in the core layer.

Optical waveguides having a structure as shown in FIG. 1 are formed, for example, as described below. A lower clad layer is formed by spin coating, and then a trench is formed by dry etching or the like. After that, a liquid containing the EO polymer dissolved in an organic solvent is formed by spin coating, whereby a core layer including the EO polymer is formed to have a rib portion that protrudes downwards. An upper clad layer is provided on the core layer by coating. Optical waveguides are not limited to the vertically inverted rib shape of FIG. 1 and may also have a configuration in which a rectangular core layer is disposed so as to be surrounded by a lower clad layer and an upper clad layer or a configuration in which a lower clad is not processed and a core layer is provided with a rib shape obtained by etching the EO polymer except for a rib portion.

In optical devices for which the EO polymer is used, a polling treatment in which a voltage is applied to a formed EO polymer layer under heating is carried out on the EO polymer layer. The heating softens the polymer, and the application of an electric field to the EO polymer layer orients the EO pigment that is contained in the polymer and has a large polarizability. When the EO polymer layer is cooled while maintaining an electric field, it becomes possible to solidify the polymer, fix the EO pigment, and maintain the orientation state.

In order to improve the polling efficiency, it is necessary to efficiently apply a strong electric field to the EO polymer layer. Since an electric field to be applied is determined in accord with proportions obtained by dividing the electric resistances of the respective layers during the application of the electric field by the total of the electric resistances of the respective layers, an effort to decrease the electric resistance of the clad layer becomes necessary. Since the EO pigment having a conductive π-conjugated system structure is added to the basic skeleton resin, generally, the EO polymer has a resistance value that becomes lower than that of the basic skeleton resin.

Therefore, for clad layers of the related art, it is not possible to use non-treated basic skeleton resins, and materials having a hydroxyl group in a resin and the like have been used. Specifically, organic-inorganic hybrid resins copolymerized by the application, drying, then, UV irradiation, and heating of a coating liquid obtained by mixing alkoxide acrylate, alkoxy silane, and a polymerization initiator have been used.

However, in these organic-inorganic hybrid resins, due to heating during the polling, the unreacted polymerization initiator remaining in a film reacts or a plurality of gases are generated due to the thermal decomposition of a catalyst for promoting a hydrolysis reaction of the alkoxy silane and the like remaining as residual components, an alcohol generated by a hydrolysis, water generated by dehydration condensation, or a terminal group attributed to the polymerization initiator introduced at the time of blending. Due to these gases, there has been a problem in that peeling occurs in an interface between a polling electrode installed on the clad layer and a clad and portions in a floating state are not uniformly polled.

In addition, in a case where the EO polymer layer is heated to 150° C. or higher during the polling, since the linear expansion coefficient of the EO polymer is a positive coefficient, the EO polymer expands; however, in clads of the related art, the EO polymer thermally contracts due to dehydration polymerization or the like, and there has been a problem in that cracks are generated due to significant stresses.

[Patent Literature No. 1] PCT Japanese Translation Patent Publication No. 2015-501945

[Patent Literature No. 1] Japanese Laid-open Patent Publication No. 2007-25370

SUMMARY OF THE INVENTION

An object that the present invention intends to achieve is to solve the above-described problem and provide an optical device in which polling of a core layer is appropriately carried out and the generation of cracks in a clad layer is suppressed.

In order to achieve the above-described object, an optical device of the present invention has the following technical characteristics.

(1) An optical device including a core layer that includes an EO polymer and clad layers that are disposed on and beneath the core layer, in which a polymer polymerized in a composition containing a reactive ionic liquid is used in the clad layers.

(2) The optical device according to (1), in which the reactive ionic liquid is a reactive group that is polymerizable with a material having a basic skeleton resin.

(3) The optical device according to (1) or (2), in which the reactive ionic liquid is a material represented by Chemical Formula 1.

Here, an anion $X^-$ is any of $[N(SO_2CF_3)_2]^-$, $[PF_6]^-$, $[BF_4]^-$, $Cl^-$, and $Br^-$. In addition, R, R', R", and R''' are hydrogen atoms or alkyl groups having 1 to 10 carbon atoms that are identical to or different from one another.

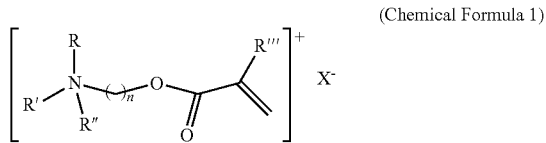

(Chemical Formula 1)

(4) The optical device according to any one of (1) to (3), further including a blocking layer that blocks migration of ions included in the reactive ionic liquid between the core layer and the clad layer.

(5) The optical device according to (4), in which the blocking layer is formed of any of $SiO_2$ and $Al_2O_3$.

The present invention is an optical device in which clad layers are disposed on and beneath a core layer and the core layer includes an EO polymer, in which a polymer polymerized in a composition containing a reactive ionic liquid is used in the clad layers, and thus not cationic radical polymerization as in the related art but a polymerization reaction, in which a Co complex is used, is used, and a polymerization initiator also does not remain. Therefore, the peeling of a polling electrode in an interface with the clad layer or the generation of cracks in the clad layers is suppressed.

DETAILED DESCRIPTION OF THE INVENTION

Figure 1:
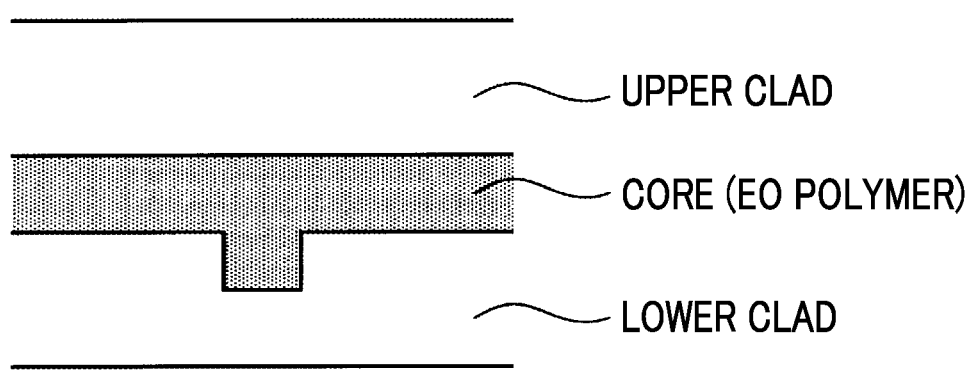
FIG. 1 is a cross-sectional view showing a scheme of an optical device of the related art.

Hereinafter, an optical device of the present invention will be described in detail using preferred examples. The optical device of the present invention is an optical device in which, as shown in FIG. 1, clad layers are disposed on and beneath a core layer and the core layer includes an EO polymer, in which a polymer polymerized in a composition containing a reactive ionic liquid is used in the clad layers.

As the EO polymer, PMMA-DR1 in which PMMA is used as a basic skeleton resin and, as an EO molecule, Disperse Red1 is polymerized into a side chain of the basic skeleton resin can be preferably used. In addition, heat resistance can be improved by increasing a glass transition temperature Tg of the EO polymer. In this case, Tg can be increased by imparting a cage-type molecule such as an adamantyl group to the side chain of the basic skeleton resin or forming a main skeleton resin in a network structure.

A characteristic of the optical device of the present invention is that a material that is used in the clad layers is, unlike a coating liquid obtained by mixing alkoxide acrylate, alkoxy silane, and a polymerization initiator, not cationic radial polymerization. Specifically, the material is a polymerization reaction by a Co complex for which a reactive ionic liquid is used. Therefore, there is no case where the polymerization initiator remains in the clad layers.

For the clad layers, a polymer of the reactive ionic liquid as shown in Chemical Formula 1 and an acrylic resin is used. The reactive ionic liquid is a material having a reactive group that can be polymerized with the basic skeleton resin.

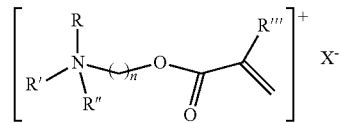

(Chemical Formula 1)

An anion $X^-$ in Chemical Formula 1 is any of $[N(SO_2CF_3)_2]^-$, $[PF_6]^-$, $[BF_4]^-$, $Cl^-$, and $Br^-$. Particularly, the diffusion of anions in the clad layers acts as a cause for the intrusion of anions into an EO polymer in the core layer. Therefore, bulky $[N(SO_2CF_3)_2]^-$ is more preferred since the diffusion thereof is suppressed.

R, R', R", and R''' in Chemical Formula 1 are hydrogen atoms or alkyl groups having 1 to 10 carbon atoms that are identical to or different from one another. R, R', and R" are more preferably hydrogen atoms, and R''' is more preferably a hydrogen atom or a methyl group.

Figure 2:
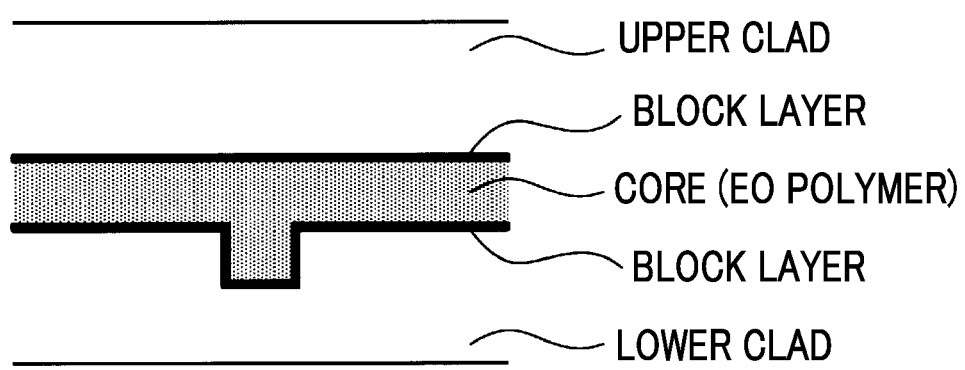
FIG. 2 is a cross-sectional view showing an example of an optical device of the present invention.

Furthermore, in order to suppress the intrusion of anions in the clad layers into the core layer, a blocking layer that blocks the migration of ions included in the reactive ionic liquid is preferably provided between the core layer and the clad layer as shown in FIG. 2.

As the blocking layer, any of $SiO_2$ and $Al_2O_3$ can be preferably used.

In a method described below, four types of clads were produced, and a test that evaluated characteristics was carried out.

Example 1

A liquid mixture was prepared by blending 1.5 wt % of a reaction-type ionic liquid IL-MA2 manufactured by Kyoeisha Chemical Co., Ltd., 28.5 wt % of UV-1700B manufactured by The Nippon Synthetic Chemical Industry Co., Ltd., 1.5 wt % of IRGACURE 127 manufactured by BASF, 15 wt % of methanol, 15 wt % of methyl isobutyl ketone, 3 wt % of butyl carbitol, and 35.5 wt % of normal butanol. The liquid mixture was applied by spin coating, dried on a hot plate at 100° C., and cured by radiating ultraviolet rays for one minute using a 300 W UV radiator, thereby forming a clad layer. As a result of measuring the clad layer as a single body, the volume resistance at room temperature was $4 \times 10^{13}$ Ωcm, and the volume resistances at 120° C., 150° C., and 180° C. were $3 \times 10^{13}$ Ωcm, $2 \times 10^{13}$ Ωcm, and $1 \times 10^{13}$ Ωcm respectively.

Example 2

Components were blended in the same manner as in Example 1 except for the fact that 6 wt % of the reaction-type ionic liquid IL-MA2 manufactured by Kyoeisha Chemical Co., Ltd. and 24 wt % of UV-1700B manufactured by The Nippon Synthetic Chemical Industry Co., Ltd. were blended. As a result of measuring a clad layer produced using this liquid mixture as a single body, the volume resistance at room temperature was $2 \times 10^{13}$ Ωcm, and the volume resistances at 120° C., 150° C., and 180° C. were $1 \times 10^{13}$ Ωcm, $5 \times 10^{12}$ Ωcm, and $3 \times 10^{12}$ Ωcm respectively.

Comparative Example 1

Components were blended in the same manner as in Example 1 except for the fact that the reaction-type ionic liquid was not blended, and 30 wt % of UV-1700B manufactured by The Nippon Synthetic Chemical Industry Co., Ltd. was blended. As a result of measuring a clad layer produced using this liquid mixture as a single body, the volume resistance at room temperature was $1 \times 10^{15}$ Ωcm, and the volume resistances at 120° C., 150° C., and 180° C. were $8 \times 10^{14}$ Ωcm, $6 \times 10^{14}$ Ωcm, and $4 \times 10^{14}$ Ωcm respectively.

Comparative Example 2

A liquid mixture was prepared by blending 20 wt % of acrylsilane KBM-503 manufactured by Shin-Etsu Chemical Co., Ltd., 10 wt % of tetramethylsilane manufactured by Kanto Chemical Co., Inc., 1.5 wt % of IRGACURE 127 manufactured by BASF, 15 wt % of methanol, 15 wt % of methanol, 15 wt % of methyl isobutyl ketone, 3 wt % of butyl carbitol, and 35.5 wt % of normal butanol and stirred at 60° C. for one hour. As a result of measuring a clad layer produced using this liquid mixture as a single body, the volume resistance at room temperature was $1 \times 10^{14}$ Ωcm, and the volume resistances at 120° C., 150° C., and 180° C. were $3 \times 10^{13}$ Ωcm, $2 \times 10^{13}$ Ωcm, and $1 \times 10^{13}$ Ωcm respectively.

(Testing method) Lower clad layers were formed using individual clad materials on silicon substrates on which gold electrodes (lower electrodes) had been formed by vacuum deposition, EO polymers having different glass transition temperatures of 120° C., 150° C., and 180° C. were applied and dried, and upper clads were formed by lamination using individual materials in the same manner as the lower clads. Gold electrodes were partially provided on the laminate film substrates in the same manner as the lower electrodes, thereby producing test specimens in which gold electrodes were not placed on parts other than the above-described gold electrode-provided parts.

Table 1 shows the evaluation results of characteristics such as surface cracks, electrode peeling, and polling regarding a variety of the test specimens. The test specimens were heated up to the same temperatures as the respective glass transition temperatures of the EO polymers, and the surfaces and the peeling statuses of the gold electrodes were evaluated. In a case where there are cracks on the surface, the case of 10 or more cracks per four-inch wafer is expressed as X, and the case of 50 cracks or more or a state in which cracks reach the EO polymer layer is expressed as XXX. In a case where electrode peeling occurs, a case where electrode peeling occurs at 10 or more places in a four-inch wafer is expressed as X, and a case where the percent defective of a waveguide pattern is 10% or more is expressed as XXX.

TABLE 1

|  | 120° C. | | | 150° C. | | | 180° C. | | |
| --- | --- | --- | --- | --- | --- | --- | --- | --- | --- |
|  | Surface cracks | Electrode peeling | Polling | Surface cracks | Electrode peeling | Polling | Surface cracks | Electrode peeling | Polling |
| Example 1 | No | ○ | ○ | No | ○ | ○ | No | ○ | ○ |
| Example 2 | No | ○ | ○ | No | ○ | ○ | No | ○ | ○ |
| Comparative Example 1 | No | ○ | x | No | ○ | x | No | ○ | x |
| Comparative Example 2 | No | x | ○ | Yes x | xxx | Δ | Yes xxx | xxx | Δ |

Regarding the evaluation of the polling treatment, optical devices were produced and evaluated using the following method. A lower electrode was formed on a Si substrate, and the above-described clad layer was formed as a lower clad. A groove that served as a waveguide was formed by photolithography and dry etching. After that, an EO polymer solution was applied by spin coating and dried, thereby forming an EO polymer layer. After that, an upper clad layer was formed on the lower clad layer in the same manner, an electrode was provided on the upper clad layer, and a polling treatment was carried out by heating the laminate up to near the glass transition temperature of the EO polymer and applying a direct-current high voltage. After that, a polling electrode was processed, and a signal electrode was formed, thereby producing an optical device. Regarding the effect of the polling, optical devices having an optical modulation intensity after the polling are expressed as O, and optical devices having no optical modulation intensity are expressed as X. Δ indicates that the optical device is not uniformly polled.

As shown in Table 1, it was confirmed that, in the clads for which the reactive ionic liquid was used, no disadvantages were caused regarding surface cracks, electrode peeling, and polling.

As described above, according to the present invention, it is possible to provide an optical device in which the polling of a core layer is appropriately carried out and the generation of cracks in clad layers is suppressed.

What is claimed is:

1. An optical device comprising:
a core layer that includes an EO polymer; and
clad layers that are disposed on and beneath the core layer,
wherein a polymer polymerized in a composition containing a reactive ionic liquid is used in the clad layers.

2. The optical device according to claim 1,
wherein the reactive ionic liquid is a material having a reactive group that is polymerizable with a basic skeleton resin.

3. The optical device according to claim 1,
wherein the reactive ionic liquid is a material represented by Chemical Formula 1,
here, an anion $X^-$ is any of $[N(SO_2CF_3)_2]^-$, $[PF_6]^-$, $[BF_4]^-$, $Cl^-$, and $Br^-$, and, R, R', R", and R''' are hydrogen atoms or alkyl groups having 1 to 10 carbon atoms that are identical to or different from one another

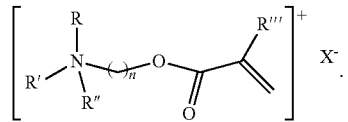

(Chemical Formula 1)

4. The optical device according to claim 1, further comprising:
a blocking layer that blocks migration of ions included in the reactive ionic liquid between the core layer and the clad layer.

5. The optical device according to claim 4,
wherein the blocking layer is formed of any of $SiO_2$ and $Al_2O_3$.

* * * * *